(12) United States Patent
Daniel-Ivad et al.

(10) Patent No.: US 6,361,899 B1
(45) Date of Patent: Mar. 26, 2002

(54) ADDITIVES FOR RECHARGEABLE ALKALINE MANGANESE DIOXIDE CELLS

(75) Inventors: Josef Daniel-Ivad; Elfriede Daniel-Ivad, both of Newmarket; James R. Book, Mississauga, all of (CA)

(73) Assignee: Battery Technologies, Inc., Richmond Hill (CA)

( * ) Notice: Subject to any disclaimer, the term of this patent is extended or adjusted under 35 U.S.C. 154(b) by 0 days.

(21) Appl. No.: 09/473,770

(22) Filed: Dec. 27, 1999

Related U.S. Application Data

(63) Continuation of application No. PCT/CA98/00627, filed on Jun. 26, 1998.

(30) Foreign Application Priority Data

Jun. 27, 1997 (GB) ................................................ 9713683

(51) Int. Cl.$^7$ ................................................. H01M 4/50
(52) U.S. Cl. ...................... 429/224; 429/232; 429/231.5
(58) Field of Search .............................. 424/224, 218.1, 424/229, 231.5, 231.6, 232, 60

(56) References Cited

U.S. PATENT DOCUMENTS

| | | | | |
|---|---|---|---|---|
| 4,096,317 A | * | 6/1978 | Annen | 429/145 |
| 4,869,980 A | | 9/1989 | Jarvis et al. | 429/202 |
| 5,026,617 A | | 6/1991 | Kosaka et al. | 429/206 |
| 5,272,020 A | | 12/1993 | Flack | 429/141 |
| 5,300,371 A | | 4/1994 | Tomantschger et al. | 429/60 |
| 5,501,924 A | | 3/1996 | Swierbut et al. | 429/224 |
| 5,626,988 A | * | 5/1997 | Daniel-Ivad et al. | 429/229 |

FOREIGN PATENT DOCUMENTS

| | | |
|---|---|---|
| WO | 9312551 | 6/1993 |
| WO | 9424718 | 10/1994 |

* cited by examiner

*Primary Examiner*—Stephen Kalafut
*Assistant Examiner*—Raymond Alejandro
(74) *Attorney, Agent, or Firm*—Amin & Turocy, LLP

(57) ABSTRACT

Rechargeable galvanic cells are disclosed which comprise a manganese dioxide cathode, a zinc anode and a potassium hydroxide electrolyte wherein the cathode includes additive compounds to increase the cumulative discharge capacity of the cell thereby increasing its cycle life. The additives consist of a) barium or strontium compounds, and mixtures thereof, and b) titanium, lanthanum, yttrium, cerium, zinc, calcium, tin or magnesium compounds, and mixtures thereof.

16 Claims, 1 Drawing Sheet

ADDITIVES FOR RECHARGEABLE ALKALINE MANGANESE DIOXIDE CELLS

This application is a continuation of international application number PCT/CA98/00627, filed Jun. 26, 1998, which was pending at the time of filing of this continuation application.

FIELD OF THE INVENTION

This invention relates to rechargeable cells having a $MnO_2$ positive electrode material, a potassium hydroxide electrolyte and zinc as the negative electrode material. The usual embodiment may be the typical "bobbin" type cylindrical cell, however, spirally wound cells, button or coin cells, and rectangular plate cells or batteries may be provided in keeping with the present invention.

BACKGROUND OF THE INVENTION

Primary and rechargeable manganesedioxide-based alkaline cells are well known and include a positive electrode having manganese dioxide ($MnO_2$) as an active material, a negative electrode utilizing zinc as the active material, an aqueous solution of potassium hydroxide as electrolyte, and a separator between the positive and negative electrode.

To overcome recharge problems of the $MnO_2$ in the positive electrode, cells were developed in which the discharge capacity of the cell was limited by imposing a zinc electrode limitation. Due to problems with the rechargeability of the $MnO_2$ cathode, these cells experience capacity fading on deep discharge, which results in a progressing reduction of the discharge time. Capacity fade shows that the manganese dioxide electrode is not fully reversible, therefore, a loss of available capacity will be observed from one discharge/charge cycle to the next. Numerous approaches have been taken to reduce the capacity fade experienced such as employing various additives to the positive and the negative electrodes.

In this regard, reference is made to Kordesch et al in German patent number 3,337,568 issued Apr. 25, 1984. This patent describes a method for producing Electrolytic manganese dioxide that is doped with titanium. Such a titanium-doped $MnO_2$ is particularly suitable for use in rechargeable manganese dioxide/zinc cells.

Kosaka et al in U.S. Pat. No. 5,026,617 issued Jun. 25, 1991, describes a rechargeable alkaline cell utilizing titanium dioxide additions to the separator for improved electrolyte retention, improved corrosion resistance and for preventing the formation of internal shorts from zinc dendrites.

Taucher et al, in WO 93/12551 filed Dec. 21, 1992, discloses improvements to primary and rechargeable alkaline manganese dioxide cells, containing barium compounds in an amount of 3–25% of the $MnO_2$ positive electrode material.

Tomantschger et al, in U.S. Pat. No. 5,300,371, issued Apr. 5, 1994, teaches a rechargeable alkaline manganese dioxide cell with improved performance and cycle life containing organic binders, and silver and barium compounds added to the $MnO_2$ positive electrode.

SUMMARY OF THE INVENTION

The present invention provides a rechargeable alkaline manganese dioxide-zinc cell having a variety of additives in the positive electrode. The cells of the present invention have a high discharge capacity on the initial discharge and a long cycle life with reduced capacity fade.

In one embodiment, the invention provides a rechargeable electrochemical cell comprising a manganese dioxide cathode, a separator, an anode and an aqueous alkaline electrolyte, the cathode including additives for increasing the cumulative discharge capacity of the rechargeable cell over the cycle life of the cell, wherein the additives comprise:

a) a first additive selected from the group consisting of barium and strontium compounds; and, b) a second additive selected from the group consisting of titanium, lanthanum, cerium, yttrium zinc, calcium, tin and magnesium compounds.

In a preferred embodiment, the present invention provides a cell comprising a manganese dioxide cathode including an additive of a barium-based and/or strontium-base compound in an amount of from about 1% to about 15% by weight of the positive electrode. Typically, such barium and strontium compounds may be in the form of sulfates, oxides, titanates and hydroxides. The effect of the barium and/or strontium based additive is enhanced in a synergistic fashion by further addition of 0.1% to 5% of a compound selected from titanium, lanthanum, yttrium, cerium, zinc, calcium, tin and magnesium or combinations thereof. Typical forms of such compounds include sulfates, oxides, hydroxides, and sulfides.

In a further embodiment, the manganese dioxide cathode of the cell may comprise from 0.1% to 5% of a hydrogen recombination catalyst. Such catalysts can be chosen from the group consisting of silver, silver oxides, and other known compounds of silver. Alternatively, the hydrogen recombination catalyst can include metal hydrides such as $Ti_2Ni$.

BRIEF DESCRIPTION OF THE DRAWINGS

These and other features of the invention will become more apparent in the following detailed description wherein reference is made to the appended FIG. 1, which is a cross-sectional view of a cell according to one embodiment of the invention.

DESCRIPTION OF THE PREYED EMBODIMENTS

Figure 1:
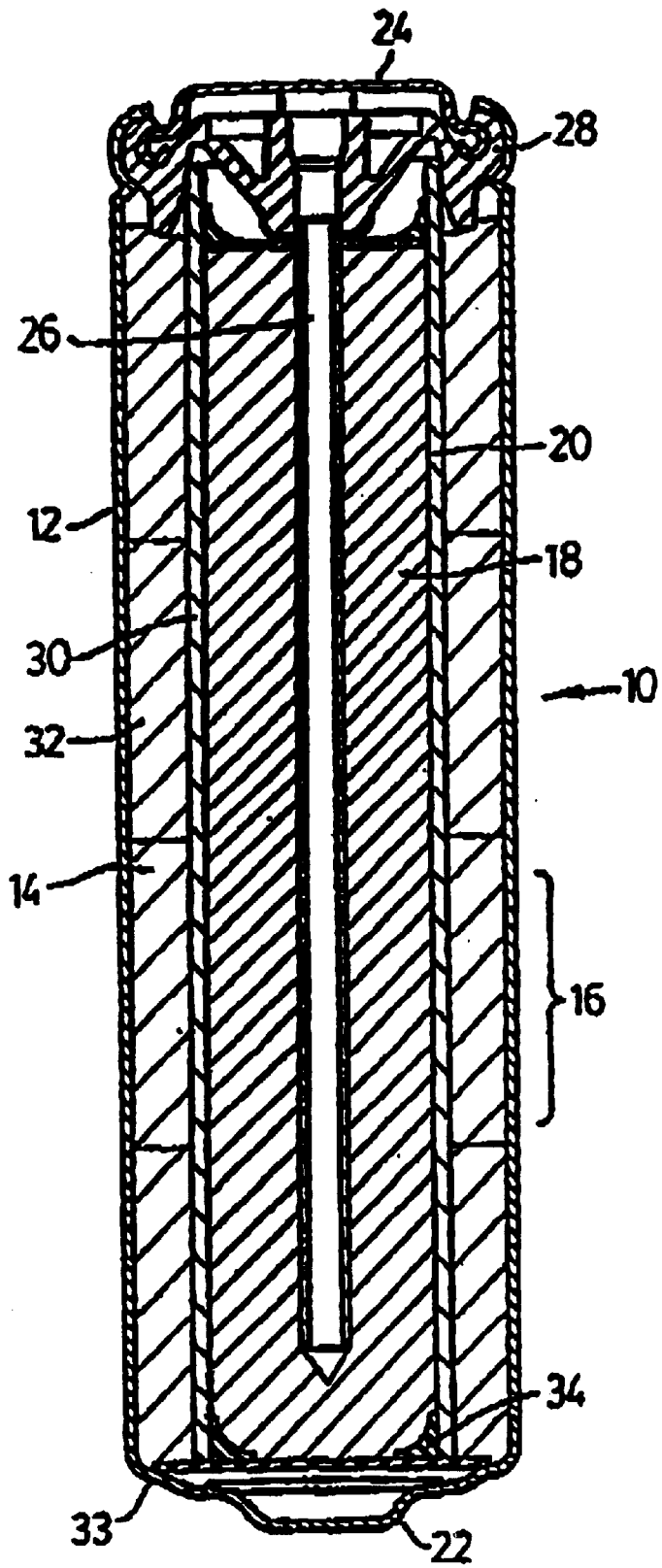

FIG. 1 shows a cross sectional elevation view of an alkaline rechargeable cell 10. The cell comprises the following main units: a steel can 12 defining a cylindrical inner space, a cathode 14 formed by a plurality of hollow cylindrical pellets 16 pressed in the can, a zinc anode 18 made of an anode gel and arranged in the hollow interior of the cathode 14, and a cylindrical separator 20 separating the anode 18 from the cathode 14. The ionic conductivity between and in the anode and the cathode is provided by the presence of potassium hydroxide electrolyte added into the cell in a predetermined quantity.

The can 12 is closed at the bottom, and it has a central circular pip 22 serving as the positive terminal. The upper end of the can 12 is hermetically sealed by a cell closure assembly which comprises a negative cap 24 formed by a thin metal sheet, a current collector nail 26 attached to the negative cap 24 and penetrating deeply into the anode gel to provide electrical contact with the anode, and a plastic top 28 electrically insulating the negative cap 24 from the can 12 and separating gas spaces formed beyond the cathode and anode structures, respectively.

The separator 20 consists of two laminated layers i.e.: a first or inner layer 30 made of a fibrous sheet material wettable by the electrolyte, and a second or outer layer 32 being impermeable for small particles but retaining ionic permeability. An expedient material for the first layer 30 is Dexter paper (grade 7490 or 7499-2) or nonwoven polyamide. The difference between these two types of paper lies their thickness. Both types of these materials can be used in primary and secondary cells to separate mechanically the anode and the cathode electrodes and to serve as an electrolyte reservoir. The macroporous structure of the inner layer 30 cannot prevent solid contamination particles from moving between the two separated spaces.

This separation is provided by the second layer 32 which has a microporous structure and preferably is an appropriate thin cellophane layer.

The two laminated layers 30 and 32 are wound together to form the separator 20.

The sealing of the bottom part of the cell can be made by using an insulator washer 33 shown in FIG. 1 which is placed to abut the bottom portion of the can 12 prior to the insertion of the cathode pellets 16. The laminated separator 20 is inserted thereafter so tat its bottom edge abuts the insulation washer 33. In this case, the contact zone between the bottom of the separator 20 and the washer is sealed by the application of a controlled amount of a hot melt or a similar thermoplastic sealant like asphalt. The sealing is done by means of an appropriate heated tool which is inserted deeply in the cylindrical cavity defined by the cathode and this dispenses a predetermined amount of melt sealant to the contact zone. After solidifying, the sealant will have a concave profile with small height and width as shown by 34 in FIG. 1.

It will be appreciated that the exact configuration of the separator 20 and its bottom seal is not critical to the present invention. FIG. 1 shows a bottom seal for the separator 20, which is the subject of earlier U.S. Pat. No. 5,272,020, but which is not essential for the present invention.

Suitable active materials in cells utilizing manganese oxides as the cathode material comprise electrolytically or chemically synthesized manganese dioxide containing typically over 90% of four valent manganese and minor amounts of lower valance oxides. The manganese dioxide powder, along with any additives, can be blended together to form the cathode material in a process as described in U.S. Pat. No. 5,300,371. Depending on the nature of the cell, the positive electrode may be molded into pellets and inserted into the can followed optionally by recompaction. Alternatively, the positive electrode may be extrude directly into the can, or it may be rolled or cast as a flat positive electrode for use in flat plate cells and button or coin cells.

As discussed above, a separator is, inserted between the positive and negative electrode. The separator is generally a complex flexible structure which is impermeable to zinc dendrites, but which is permeable to ions and may be permeable to the passage of gases such as hydrogen or oxygen that are produced within the cell on overcharge, standby, or overdischarge conditions. The separator may comprise an absorber layer made from cellulose, Rayon™, polyamide, polypropylene or polyvinylalcohol fibers, and an ion permeable membrane layer made of cellulose, Cellophane™, radiation grafted polyethylene, polypropylene, or the like.

The negative zinc electrode comprises powdered metallic zinc or zinc alloys and optionally zinc oxide together with a suitable gelling agent such as carboxymethyl cellulose, polyacrylic acid, starches, and their derivatives.

Zincate mobility within the cell way be reduced by the use of additives to the negative electrode mix such as 1% to 30% of compounds of magnesium, barium, and calcium, typically their oxides, or their hydroxides, or mixtures thereof, as described in U.S. Pat. No. 5,300,371.

The electrolyte is an aqueous alkaline solution of usually 4N to 12N potassium hydroxide. The electrolyte may contain additives such as dissolved zinc oxide. ZnO, so as to reduce the gassing of the active zinc within the negative electrode, and so as to permit overcharge of the cell without damaging same. Also, ZnO may be optionally included in the cell as a age reserve mass.

Appropriate cell designs, providing negative and positive electrodes respectively connected to negative and positive terminals for the cell, and separated by an appropriate separator, may be provided in bobbin cells, spirally wound cells, flat plate cells, and button or coin cells.

As discussed above, it has been found that various additives to the cathode material reduce capacity fade in rechargeable cells and in an increased cumulative discharge capacity. The subject additives consist of 1% to 15% by weight of the cathode material of barium or strontium compounds in combination with compounds chosen from the group consisting of from titanium, lanthanum, yttrium, cerium, zinc, calcium, tin and magnesium and combinations thereof, present in the cell in an amount of 0.1% to 5% by weight of the cathode material. The barium and strontium compounds are present in the cell preferably in forms such as sulfates, manganates, oxides, titanates or hydroxides. The titanium, lanthanum, yttrium, cerium, zinc, calcium, tin and magnesium compounds are present in the cell preferably in the forms of sulfates, oxides, hydroxides or sulfides. The amount of the various additive compounds will vary depending on the size of the cell. For example, a "D" size cell would preferably include up to 15% of a barium compound and about 5% of a titanium compound whereas a "C" cell would preferably include up to 10% of a barium compound and 2% of a titanium compound. For "AA" cells the preferred amounts of the additives are approximately 5% to 7% of a barium compound and approximately 0.5% to 1% of a titanium compound.

Cells according to the present invention may include a number of other additives for purposes of enhancing the conductivity and the structural integrity of the manganese dioxide positive electrode, or for enhancing hydrogen recombination at the electrode. For example, the manganese dioxide electrode may include at least one additive chosen from the group consisting of graphite, carbon black, inorganic binders, and organic binders.

As noted, the present invention is applicable not only to bobbin type cells, but also to spirally wound cells, button or coin cells, and to flat plate cells.

The following examples will assist those skilled in the art to better understand the invention and its principles and advantages. It is intended that these examples be illustrative of the invention and not limit the scope thereof.

EXAMPLE 1

Alkaline AA-size cells were prepared as described in U.S. Pat. No. 5,300,371 and the above description, except that various additives were combined with the positive electrode material. In this example the additives consisted of barium sulfate and titanium dioxide in the amounts shown in Table 1 below. In all cases the additives replaced part of the active electrolytic manganese dioxide (EMD) material in a way that the volume of the total cell materials was maintained at a constant level.

The various sets of test cells from each of the groups were cycle tested by continuously discharging the cell on a 3.9Ω load resistor to a cutoff voltage of 0.9 Volts, followed by a 12 hour recharge to 1.65 Volts.

Table 1 shows the average discharge capacity of the test cells on the tenth discharge the $25^{th}$ discharge as well as the cumulative capacity obtained in 25 cycles. The term cumulative discharge capacity defines the total delivered discharge capacity over the 25 discharge/charge cycles by addition of the individual capacities from such cycles.

TABLE 1

Performance Comparison of AA Test Cells on the Motor Toy Test (3.9Ω to 0.9 V)

| Additives to Positive Electrode | Group 1 | Group 2 | This Invention |
|---|---|---|---|
| $BaSO_4$, wt. - % added to EMD | 6.2% | 0% | 6.2% |
| $TiO_2$, wt. - % added to EMD | 0% | 1.25% | 0.75% |
| Cycle 10 [mAh]/% Change | 590/0% | 580/-1% | 700/19% |
| Cycle 25 [mAh]/% Change | 460/0% | 450/-3% | 570/23% |
| 25 Cycle Cumulative mAh/% Change | 15,670/0% | 15,140/-3% | 17,210/10% |

From a review of Table 1 above, it is evident that a synergistic effect is observed for the Ba and Ti addition resulting in a 23% improved capacity on the $25^{th}$ cycle, and a cumulative capacity advantage of 10% over the addition of a barium compound alone.

EXAMPLE 2

A similar synergistic 10% increase of cumulative capacities was achieved when strontium was substituted for part or all of the barium compound in group 1. Table 2 shows cycling test data for an experiment were the barium sulphate was substituted with strontium sulphate. The data shows that all results were within normal variations, and that, therefore, strontium compounds are suitable for the present invention.

TABLE 2

Performance Comparison of AA Test Cells on the Motor Toy Test (3.9 Ohm to 0.8 V) with Strontium sulfate vs. Barium sulfate and Titanium Dioxide as Cathode Additives

| Additive 1 wt. - % added to EMD | $BaSO_4$ | 6.24% | $SrSO_4$ | 5.45% |
|---|---|---|---|---|
| Additive 2 wt. - % added to EMD | $TiO_2$ | 0.75% | $TiO_2$ | 0.74% |
| Cycle 25 | | 100% | | 101% |
| Cumulative over 25 Cycles | | 100% | | 102% |

EXAMPLE 3

Table 3 shows the results for comparative tests wherein compounds of lanthanum, cerium, yttrium, zinc, calcium, tin, magnesium were substituted for the Ti compound (second additive). As shown, such compounds also provided a 10% synergistic effect as with the use of Ti compounds. The control group in this experiment was the Ba/Ti additive combination and all results were compared this control group. As can be seen from Table 3, results are within normal experimental variation therefore indicating that all the above noted additives are effective.

TABLE 3

Performance Comparison of AA Test Cells on Motor Toy Test (3.9 Ohm to 0.9 V) with Barium Sulfate and Various Compounds as Cathode Additives.

| Compound added to cathode | wt. - % added to EMD | wt. - % $BaSO_4$ added to EMD | Cycle 25 % vs. Control | Cumulative 25 Cycles % vs. Control |
|---|---|---|---|---|
| $TiO_2$/Control | 0.75% | 6.2% | 0% | 0% |
| CaO | 1.25% | 6.3% | 2% | 0% |
| $CeO_2$ | 1.25% | 6.3% | 0% | 3% |
| $La_2O_3$ | 1.25% | 6.3% | 2% | 0% |
| MgO | 1.25% | 6.3% | 1% | 2% |
| $SnO_2$ | 1.25% | 6.3% | 2% | -1% |
| $Y_2O_3$ | 1.25% | 6.3% | -2% | 0% |
| ZnO | 1.26% | 6.3% | 1% | 2% |

EXAMPLE 4

Alkaline AA-size cells prepared as described above were discharged at 3.9Ω to 0.9V followed by a recharge. Immediately following the second discharge the cells were placed into high temperature storage without recharge for two weeks at 65° C. This test represents an accelerated storage condition in the discharged state of the cell. Thereafter, the cells were recharged and the cycling continued. Table 4 below shows the average discharge capacity of the test cells on the third discharge and the cumulative capacity obtained in 5 cycles.

TABLE 4

Performance Comparison of rechargeable AA Test Cells on the Motor Toy Test (3.9Ω to 0.9 V), including a two week storage at 65° C. in the discharge state following the second discharge.

| Additives to Positive Electrode | Group 1 | Group 2 | This Invention |
|---|---|---|---|
| $BaSo_4$, wt. - % added to EMD | 6.2% | 0% | 6.2% |
| $TiO_2$, wt. - % added to EMD | 0% | 0.75% | 0.75% |
| Cycle 3 mAh/% Change | 620/0% | 260/-59% | 780/26% |
| 5 Cycle Cumulative mAh/% Change | 4,150/0% | 3,150/-24% | 4,440/7% |

In this example the barium compound used was barium sulfate and the titanium compound was titanium dioxide.

Table 4 indicates that a synergistic effect is observed for the barium and titanium addition, resulting in a substantially improved capacity retention on the third discharge when compared to the barium only or titanium only addition.

EXAMPLE 5

Other barium compounds evaluated included barium manganates (V and VI valent), barium titanates, barium hydroxide, and barium oxides. Such compounds were also found to provide similar results. Tests were conducted on AA cells in a manner similar to that described above and the results are summarized in Table 5 below.

TABLE 5

Performance of AA Test Cells on the Motor Toy Test (3.9 Ω to 0.9 V)

| Additives to Positive Electrode | Groups | | | This Invention | | | |
|---|---|---|---|---|---|---|---|
| | 1 | 2 | 3 | 4 | 5 | 6 | 7 |
| Barium Compound | $BaSO_4$ | $BaSO_4$ | — | $BaSO_4$ | $BaO$ | $BaMnO_4$ | $Ba(OH)_2 \cdot 8 H_2O$ |
| wt. % Ba-compd added to EMD | 6.2 | 0 | 0 | 6.2 | 4.3 | 6.9 | 8.0 |
| mol % Ba added to EMD | 3.7 | 0 | 0 | 3.7 | 3.8 | 3.7 | 3.7 |
| $TiO_2$, wt. % to EMD | 0 | 1.25 | 0 | 0.75 | 0.74 | 0.76 | 0.74 |
| mol % Ti to EMD | 0 | 0.75 | 0 | 0.45 | 0.44 | 0.45 | 0.44 |
| Cycle 10 [mAh] | 590 | 580 | 490 | 700 | 710 | 720 | 700 |
| % Change | 0% | −1% | −17% | +19% | +20% | +22% | +19% |
| Cycle 25 [mAh] | 460 | 450 | 425 | 570 | 580 | 585 | 565 |
| % Change | 0% | −3% | −8% | +23% | +26% | +27% | +23% |
| Cumulative 25 Cycles [mAh] | 15,670 | 15,140 | 13,630 | 17,210 | 17,550 | 17,720 | 17,200 |
| % Change | 0% | −3% | −13% | +10% | +12% | +13% | +10% |

In this example the barium compounds used were barium sulfate, barium oxide, barium hydroxide and barium manganate and the second additive used was titanium dioxide. From a review of Table 5 above, it is evident that a synergistic effect is observed for the Ba and Ti addition resulting in a 23–27% improved capacity on the $25^{th}$ cycle, and cumulative capacity advantage of 10–13% over the Ba-only addition.

Titanium compounds investigated included rutile or anatase $TiO_2$, $BaTiO_3$, and non-stoichiometric titanium oxides ($TiO_x$, x=1.7 to 1.9), sulfates or hydroxides of titanium. All compounds showed similar effects.

Due to the different cathode dimension in the 4 popular cell se AAA, AA, C and D, different cathode formulations will be required to achieve equivalent positive effects from this invention. The approximate cathode pellet thickness is as follows: AAA and AA, approximately 2 mm; C, approximately 4 mm; and D, approximately 6 mm. It was found that for double the cathode layer thickness, double amounts are required to achieve similar equivalent performance. For example, C size cells will work best in the 10% barium compound and 2% titanium compound range. AAA has somewhat smaller cathode thickness and requires somewhat lower additives for best performance.

Although the invention has been described with reference to certain specific embodiments, various modifications thereof will be apparent to those skilled in the art without departing from the spirit and scope of the invention as outlined in the claims appended hereto.

What is claimed is:

1. A rechargeable electrochemical cell comprising a manganese dioxide cathode, a separator, an anode and an aqueous alkaline electrolyte, said cathode including additives for increasing the cumulative discharge capacity of the rechargeable cell over the cycle life of the cell, wherein said additives comprise:
   a) a first additive selected from the group consisting of barium and strontium compounds; and,
   b) a second additive selected from the group consisting of titanium, lanthanum, cerium, yttrium, zinc, calcium, tin and magnesium compounds, wherein the cumulative discharge capacity of the cell is at least 10% over the cumulative discharge capacity with either additive alone and said second additive is present in an amount of from about 0.1% to about 5% by weight of the cathode.

2. A cell as claimed in claim 1 wherein said first additive includes sulfates, manganates, titanates, hydroxides, and oxides of barium and strontium.

3. A cell as claimed in claim 1 wherein said second additive compounds comprise sulfates, oxides, hydroxides or sulfides.

4. A cell as claimed in claim 1 wherein said second additive comprises a titanium compound selected from the group consisting of rutile $TiO_2$, anatase $TiO_2$, non-stoichiometric titanium oxides, and titanates.

5. A cell as claimed in claim 1 wherein said second additive is selected from $TiO_2$ and $CaO$.

6. A cell as claimed in claim 1 wherein said first additive is present in an amount of from about 1% to about 15% by weight of said cathode.

7. A cell as claimed in claim 1 wherein said manganese dioxide cathode further includes from 0.1% to 5% by weight of a hydrogen recombination catalyst.

8. A cell as claimed in claim 1 wherein said anode comprises metallic zinc or zinc alloy powder, zinc oxide powder, or mixtures thereof.

9. A cell as claimed in claim 1 wherein said separator comprises at least one ion permeable membrane layer which is impermeable to zinc dendrites, wherein said ion permeable membrane consists of cellulose, cellophane, polyvinylalcohol, polypropylene or polyethylene or mixtures and derivatives thereof.

10. A cell as claimed in claim 1 wherein said aqueous electrolyte is 4N to 12N potassium hydroxide.

11. A cell as claimed in claim 1 wherein said electrolyte further includes dissolved ZnO.

12. A rechargeable electrochemical cell comprising a manganese dioxide cathode, a separator, an anode and an aqueous alkaline electrolyte, said cathode including additives for increasing the cumulative discharge capacity of the rechargeable cell over the cycle life of the cell, wherein said additives comprise:
   a) a first additive selected from the group consisting of barium and strontium compounds; and,
   b) a second additive selected from the group consisting of titanium, lanthanum, cerium, yttrium, zinc, calcium, tin and magnesium compounds, wherein the cumulative discharge capacity of the cell is at least 10% over the cumulative discharge capacity with either additive alone and wherein said first additive is present in an amount of from about 4% to about 8% by weight of the cathode and said second additive is present in amount of from about 0.7% to about 0.8% by weight of the cathode.

13. A cell as claimed in claim 12 wherein said hydrogen recombination catalyst is selected from the group consisting of silver, oxides of silver, compounds of silver and metal hydrides.

14. A cell as claimed in claim 12 wherein said second additive comprises a titanium compound selected from the group consisting of rutile $TiO_2$, anatase $TiO_2$, non-stoichiometric titanium oxides, and titanates.

15. A rechargeable electrochemical cell comprising a manganese dioxide cathode, a separator, an anode and an aqueous alkaline electrolyte, said cathode including additives for increasing the cumulative discharge capacity of the rechargeable cell over the cycle life of the cell, wherein said additives comprise:

a) a first additive selected from the group consisting of barium compounds present in an amount of from about 1% to about 15% by weight of said cathode; and, b) a second additive selected from the group consisting of titanium compounds present in an amount of from about 0.1% to about 5% by weight of the cathode.

16. A rechargeable cell of claim 15 wherein the first additive is present in an amount of about 6.2% by weight of said cathode and the second additive is present in an amount of about 0.75% by weight of the cathode.

* * * * *